Dec. 13, 1955    R. G. LE TOUREAU    2,726,553
GEAR REDUCTION SYSTEM
Filed June 6, 1952    4 Sheets-Sheet 1

INVENTOR.
ROBERT G. LETOURNEAU
BY Lyon & Lyon
ATTORNEYS

INVENTOR.
ROBERT G. LETOURNEAU
BY
Lyon & Lyon
ATTORNEYS

Dec. 13, 1955 R. G. LE TOUREAU 2,726,553
GEAR REDUCTION SYSTEM

Filed June 6, 1952 4 Sheets-Sheet 4

*INVENTOR.*
ROBERT G. LE TOURNEAU
BY
*Lyon Lyon*
*ATTORNEYS*

United States Patent Office 2,726,553
Patented Dec. 13, 1955

2,726,553

GEAR REDUCTION SYSTEM

Robert G. Le Tourneau, Longview, Tex.

Application June 6, 1952, Serial No. 292,157

12 Claims. (Cl. 74—410)

This application is a continuation-in-part of my co-pending application, Serial No. 181,038, entitled "Electric Wheel," filed August 23, 1950.

This invention relates to gearing systems of the non-planetary type having a single pinion in contact with a plurality of gears, and used in electric wheel units, rolling mill drives as well as other systems.

An important object of my invention is to provide a gear reduction system for driving wheels, rolling mills or the like having a novel gear adjusting arrangement by which the proper gear tooth contact and equalized loading between the various gears may be established.

Another object is to provide a novel spider-like structure to be installed within the rim of the wheel to provide bearing support for the various reduction gears.

Another object of my invention is to provide in a helical gearing system a drive pinion supported at one end only and freely floating between a plurality of reduction gears at its other end.

Another object is to provide equal pressure distribution between plural reduction gears in a single pinion drive system.

These and other objects will become apparent upon perusal of the specification and claims.

Figure 1:
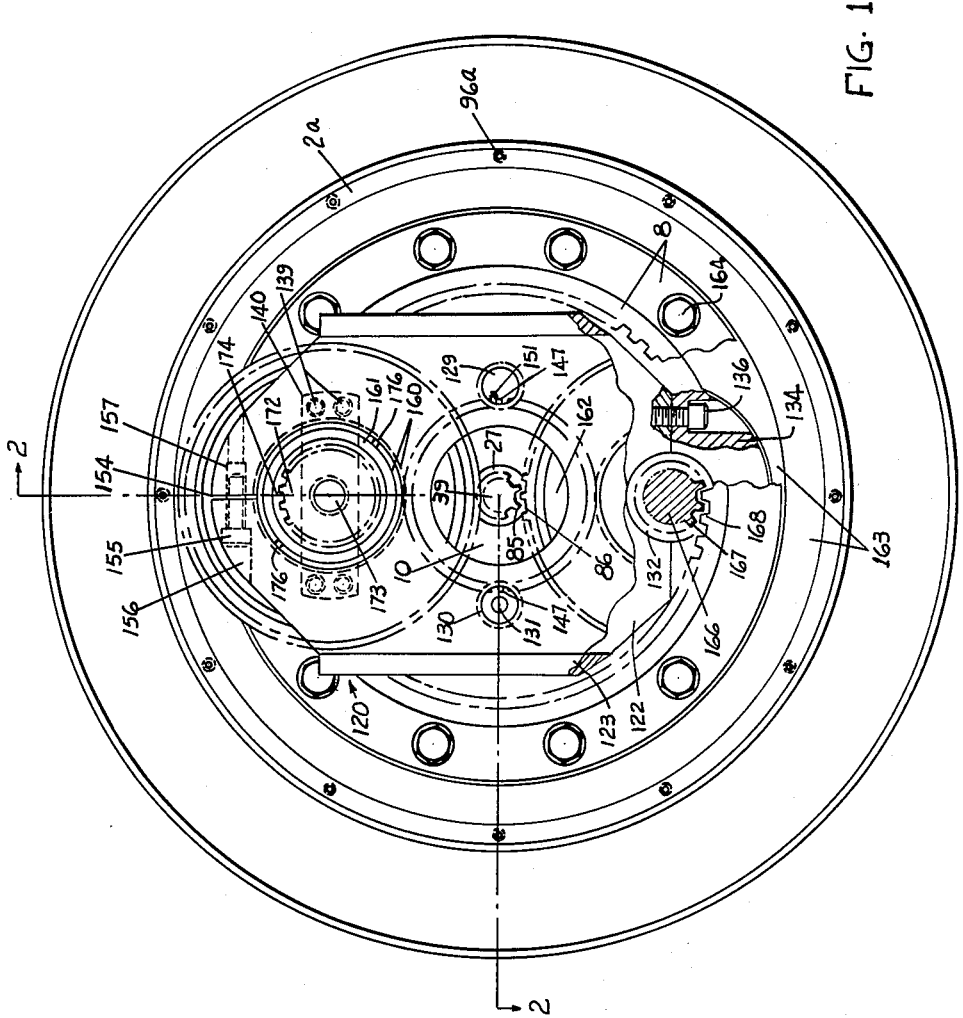
Figure 1 represents an elevational view of a wheel unit from the reduction gearing side in which the end cover has been removed and in which fragmentary sections are taken to show certain details.

Referring now more particularly to the drawings, the complete wheel unit indicated generally at 1 (Figure 2) is seen to consist basically of: a generally cylindrical wheel body 2 including at its outer circumferences a fixed tire retaining rim 3 and a removable tire retaining rim 4 which support a pneumatic tire (not shown) and an axially mounted electric motor unit 6 projecting from one side of the unit 1 and connected in driving relation to reduction gearing 7 at the other side of the wheel, which system ultimately drives an internal ring gear 8 which causes wheel body 2 to rotate through bearings 9 about motor housing extension 10 which is in the form of a flanged tube.

Wheel body 2 includes supporting disks 11 which are welded to cylindrical center rim 2a of body 2 at 12 and are additionally welded at 13 to a cylindrical hub 14 which is journalled by means of bearings 9 to motor housing extension 10.

Motor unit 6 includes as part of its housing a generally cylindrical extension 10, including a central bore 27, attached to the cylindrical central frame 28 by welding 29.

Motor pinion shaft 39 is located within the center hole 80 of hollow rotor shaft 72 and does not touch shaft 72 except at ridge 81 and its splines 58 which engage splines 58a of shaft 72. Ridge 81 tapers as at 82 down to the inner diameter of splines 58 so that when pinion nut 83 tightens on threads 84 of pinion shaft 39, the pinion shaft 39, and rotor shaft 72 are drawn into firm engagement with each other. Since pinion shaft 39 is extremely long relative to its diameter, and since its pinion 85 is at the unsupported end of the shaft, this pinion can be easily moved, as will later be described, into equal engagement with countershaft gear teeth 86 of both countershaft reduction gears 162, and it will tend to equalize tooth loading in the engagement since it is free to float in space to a limited extent. A long unsupported shaft such as 39 is known to have desirable qualities of absorbing otherwise dangerous torsional vibration. One unobvious quality of this described arrangement is that it has been discovered that the pinion 85 will remain in engagement after having once been centered and will not jump out of engagement as would be supposed when placing a small unsupported gear into engagement with two diametrically opposed fixed position gears. The invention is also adapted for use with more than two reduction gears meshing with the drive pinion. Thus it is within the scope and spirit of the invention to use three, four or more countershafts and reduction gears in the gear group with the drive pinion and the final ring gear.

Motor housing extension or tube 10 includes a bearing housing 87 for bearing 73 which also houses a seal 88 which cooperates with housing 87 and rotor shaft 72 to prevent oil from oil case 89 from entering the interior of motor frame 28. It will be observed that oil can enter bore 27 and lubricate bearings 73 and can travel into center hole 80 as far as ridge 81 in addition to circulating throughout the entire oil case 89 due to movement of wheel body 2 which, together with wheel cover 95, forms the walls for case 89. Cover 95 is attached to center rim 2a by a circle of bolts 96 which engage bolt holes 96a in rim 2a. Filler plug 97 is provided centrally of cover 95 to permit filling case 89 with oil to approximately the half-way mark. Bearing 9 also receives lubricant from the oil case 89, since a passage for oil is available all the way to sealing ring 98 which operates between lip 99 of motor housing extension 10 and lip 100 of wheel hub 14.

Figure 2:
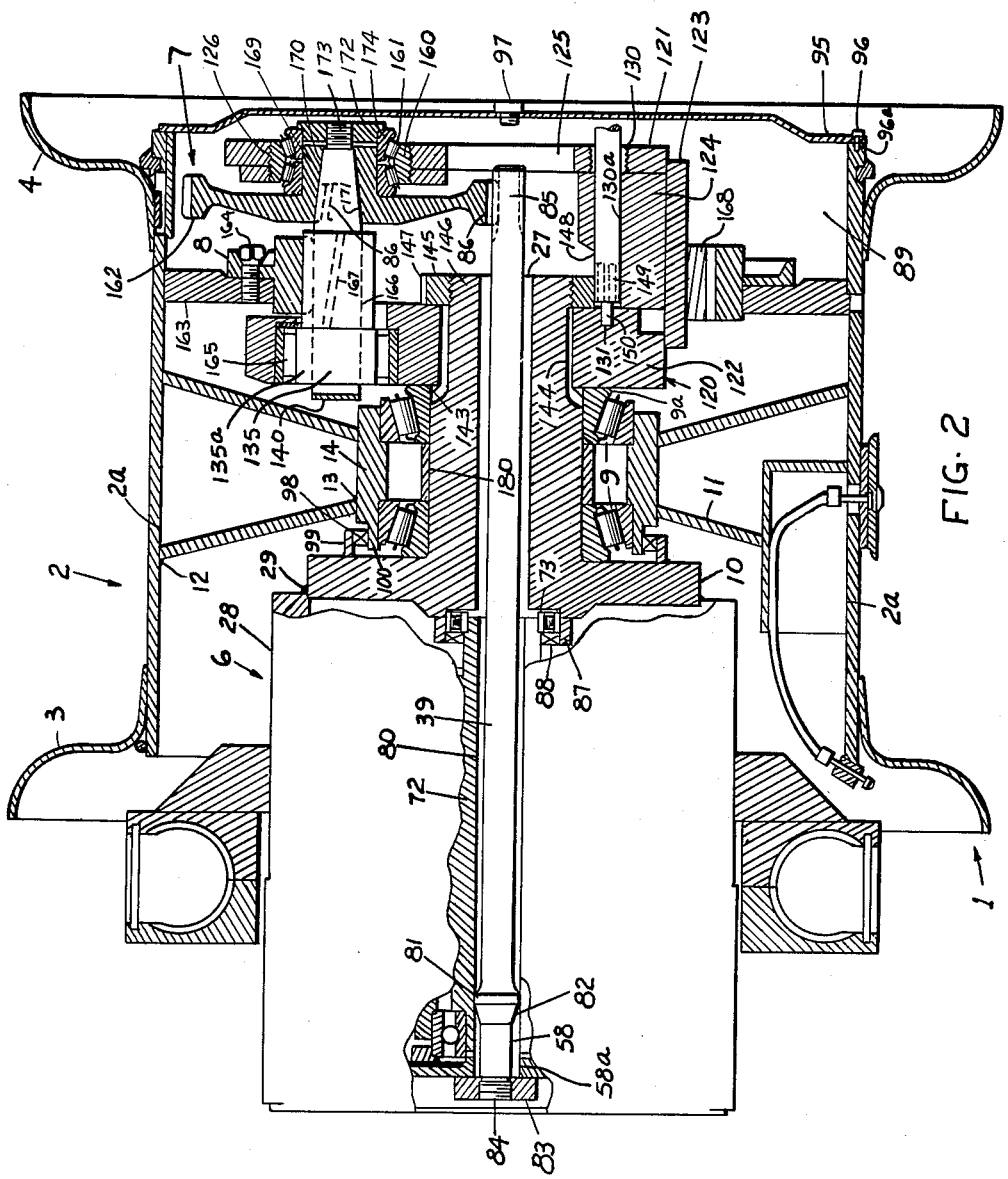
Figure 2 represents a sectional view of the wheel in Figure 1 along the lines 2—2 thereof.
Figure 3:
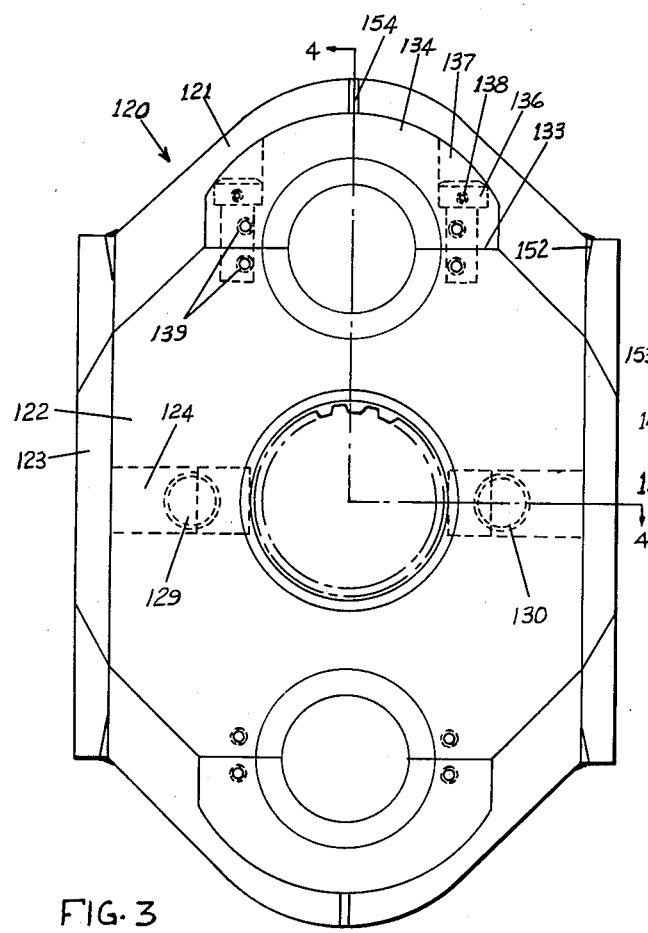
Figure 3 is a rear view of the unique spider-like structure employed in this wheel taken from the motor side.
Figure 4:
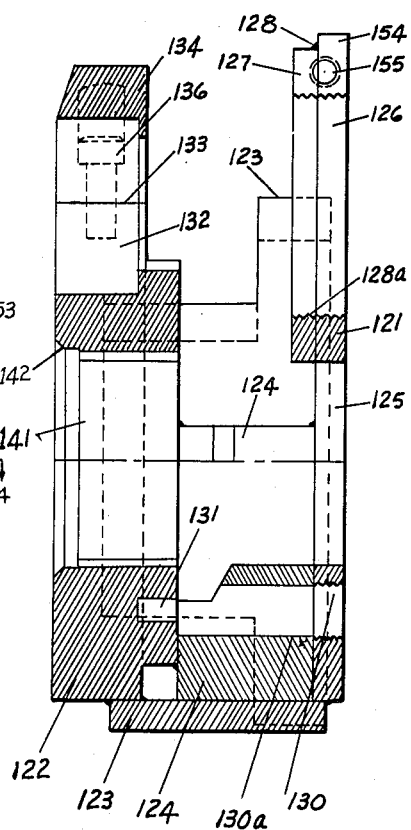
Figure 4 is a sectional view of the structure shown in Figure 3 taken along the lines 4—4 thereof.
Figure 5:
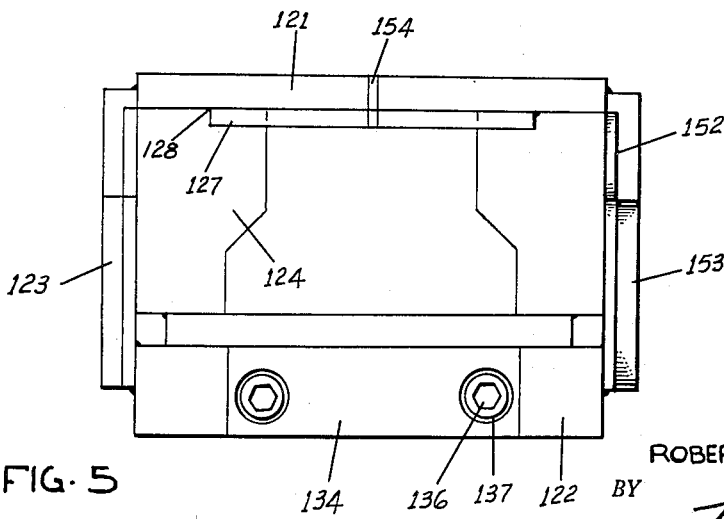
Figure 5 is a top plan view of the structure shown in Figure 3.

The novel spider-like structure, indicated generally at 120, is a rigid structure and is used to support the reduction gearing 7 within the oil case 89 to provide driving connections between pinion 85 and ring gear 8 of the wheel body 2. This structure may be examined in Figure 2 with reference to Figures 3–5. The basic unit is made up of a front plate 121, a rear plate 122, spaced apart by T-shaped side plates 123 and L-shaped spacers 124. The front plate 121 has a center opening 125 and diametrically opposed threaded openings 126 on each side thereof. The threaded openings are reinforced by aligned threaded rings 127 welded to the back of front plate 121 at 128 and 128a. At each lateral side of center opening 125 are two small threaded holes 129 and 130; these holes extend as 129a and 130a into L-shaped spacers 124. Beyond hole 130a in back plate 122 is a smaller diameter blind hole 131 for a purpose later described. Back plate 122 includes holes 132 which align with threaded openings 126 of the front plate 121. That portion of the back plate 122 surrounding the holes 132 is separable along a horizontal center line as at 133 (Figures 3 and 4), so that cap plate 134 can be removed to facilitate installation of countershafts 135 in the assembly of the wheel and gears. Capscrews 136 are inserted in countersunk and threaded openings 137 and when tightened to the desired degree, a setscrew 138 prevents capscrew 136 from working loose. When cap plate 134 is thus attached as part of the back plate 122, tapped holes 139 on each side of holes 132 are in position to receive bolts for positioning a retainer strap 140 (Figures 1 and 2) which limits the rearmost position of countershaft 135 and its pressed-on bushing 135a at assembly and under operating conditions. Back plate 122 also contains a splined center opening 141 which is beveled at 142 for engagement with a corresponding bevel 143 on motor housing extension 10 at the time the splines 144 of extension 10 engage splines of opening 141 (Figure 2).

When spider-like structure 120 is installed on extension 10, an internally threaded nut 145 engages the threaded end 146 of extension 10 and causes bevels 142 and 143 to seat and thus result in a rigid engagement of the spider and extension through their corresponding splines 144 and 141. Nut 145 is externally splined as at 147, and to permit tightening during assembly, a wrench 148 including teeth 149 is inserted through holes 130 and 130a until tip 150 of wrench 148 is seated in blind hole 131 in free turning relation. Wrench 148 may now be rotated in either direction to tighten or remove nut 145 as desired. At a diametrically opposite position on face plate 121 (Figure 1), the second hole 129 presents an opening for a setscrew wrench to be inserted to tighten or remove setscrew 151 which threads into back plate 122 at a point between the teeth of spline 147, so that when threaded into position the nut 145 is incapable of movement and is effectively locked in its position. T-shaped side plate 123 includes oppositely inclined tapers 152 and 153 to provide clearance at installation for operation of countershaft gears and ring gear 8 respectively. Face plate 121 is slotted at its top and bottom at 154 from threaded opening 126 to the outer edge of the plate. This slot is bridged at assembly by bolt 155 which engages countersunk slot 156 on one side of the slot and extends into and engages threaded hole 157 on the other side of the slot 154. This construction provides a means for locking the threaded outer race 160 of bearing 161 of countershaft gear 162 after the race 160 has been threadedly adjusted to desired position.

At final assembly the structure 120 will have been installed on tube 10, and ring gear 8 will be fastened to flange 163 by means of capscrews 164, and the reduction gearing 7 will occupy the position now described. Countershaft 135 including bushing 135a is inserted in bearings 165 seated in holes 132 and countershaft pinion 166 including helical teeth 167 will be in mesh with the helical teeth 168 of ring gear 8. Countershaft gear 162 includes a hub 169 with an internal tapered and serrated bore 170 which matchingly engages the tapered and serrated portion 171 of countershaft 135. When helical teeth 86 of gear 162 are in mesh with the helical teeth of pinion 85, the bearings 161 may be installed on hub 169 by threading the outer race 160 into threaded opening 126. Nut 172 is then threaded onto shank 173 of countershaft 135 so that it acts as a retainer for inner race 174 of bearings 161.

During assembly, it is necessary to center pinion shaft 39 so that equal tooth engagement will be provided for all of the gears of gearing 7. For this purpose the holes 129 and 130 provide an excellent guide for inserting a center jig so that it may be determined just when pinion 85 is accurately centered. However any well known means may be employed to gage the exact center of the assembled unit. One of the main features of this invention is the manner of accomplishing the adjustment, as follows. Before this adjustment is accomplished, the pinion shaft 39 will be to the right or left of the vertical center line; by advancing or retracting outer race 160, by means of its wrench engaging wrench slots 176, the countershaft 135 and gear 162 are moved axially of the wheel; when this happens teeth 167 move along the helical angle of teeth 168 of gear 8 so that countershaft 135 will rotate slightly causing gear 162 to rotate and move pinion shaft with it and in a lateral direction toward the center of the wheel. The fact that shaft 39 is unsupported at its pinion and will permit it to "float" slightly in an attempt to equalize the load between itself and driven gears 162, and will provide a means for absorbing and reducing torsional vibration. The countershaft 135 and its bushing 135a will move in an axial direction within bearing 165 during this adjustment. When the shaft 39 has been moved to the exact center of the wheel, as measured by the center jig, the outer race is locked in position by tightening bolt 155 and causing slot 154 to contract and bind the threads of hole 129 against the threads of outer race 160.

The structure 120, when in place, also serves as a retainer for main wheel bearings 9 by abutting against the inner races 9a and clamping them firmly between motor housing extension 10 and bearing spacer 180.

If it is desired to provide for a speed for the driven unit which is faster or slower than the range available from motor 6 and the gear ratios provided by reduction gearing 7 and ring gear 8, this may be accomplished by installing another countershaft in place of countershaft 135 which has a different tooth pinion thereon. Then if a corresponding tooth ring gear is installed for gear 8, a different drive ratio will result. The same reduction gear 162 may be used since it is separable from countershaft 135.

Figure 7:
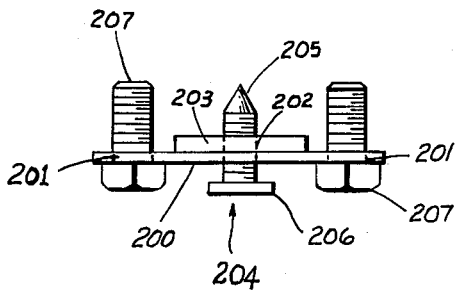
Figure 7 is a plan view of the jig shown in Figure 6.
Figure 6:
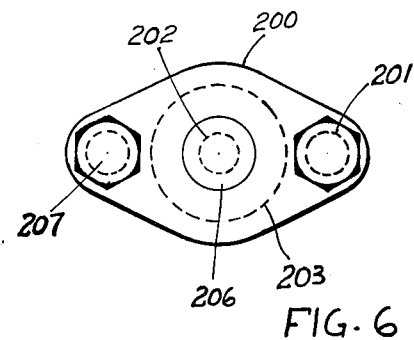
Figure 6 is an end view of the centering jig used to align the motor pinion of this invention.

Details of the centering jig used to determine when the pinion 85 has been centrally adjusted between gears 162 may be seen in Figures 6 and 7. It consists of an oblong plate 200 with two drilled holes 201 at the outer sides of the plates and a central tapped hole 202. The two outer holes are located to align with tapped holes 129 and 130 of structure 120, and the central hole is concentric with center opening 125 of the structure and also recess 27 of motor housing extension 10. Plate 200 includes a boss 203 which is accurately machined to permit a close sliding fit into hole 125. An aligning screw 204, threaded through central hole 202, includes a pointed tip 205 and a knurled hand wheel 206. The two holes 201 receive capscrews 207 to permit the jig to be held in place while the alignment is being made. When boss 203 is snugly seated in hole 125 and capscrews 207 are tightened into holes 129 and 130, the hand wheel 206 is turned to advance screw 204 in hole 202 until the tip 205 is near the end of pinion 39. If the alignment is correct, tip 205 will mesh with the countersunk center hole (present in most machined parts) of pinion 39. If it is not in perfect alignment, bearing 161 is turned as previously described until the desired alignment has been attained.

Figure 8:
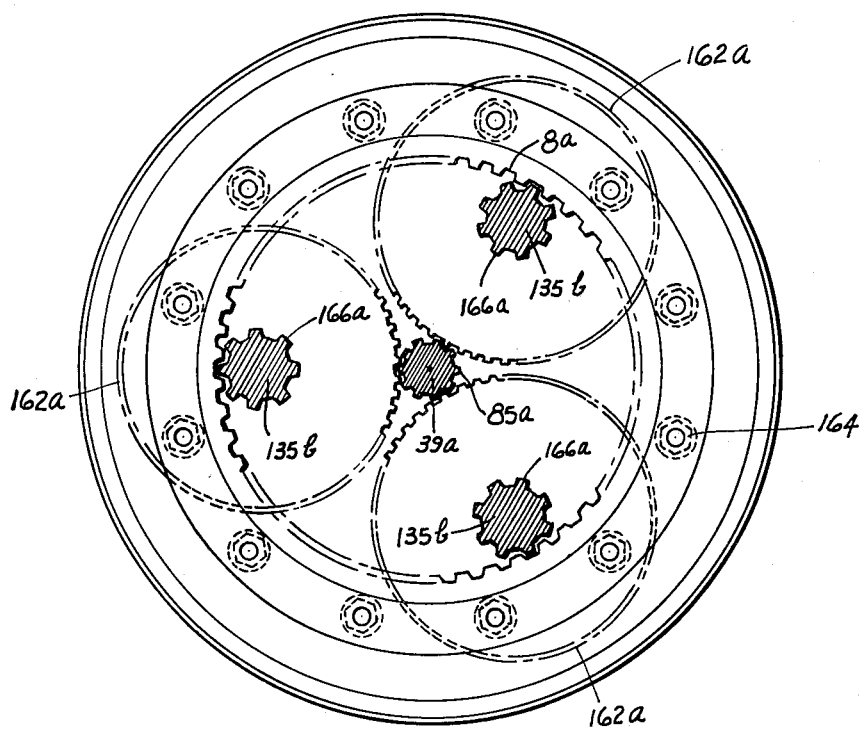
Figure 8 shows another embodiment of my invention having three countershaft gears.

As mentioned above my invention may be used with more than two reduction or countershaft gears meshing with the drive pinion. An embodiment of my invention using three countershaft gears is shown in Figure 8. Pinion 85a on the end of shaft 39a floats freely between countershaft gears 162a, three in number. Gears 162a are mounted on countershafts 135b which in turn carry countershaft pinions 166a meshing with ring gear 8a. Ring gear 8a constitutes the final drive gear and may be used with a wheel unit of the type described or in rolling mills or other devices.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A gear reduction system comprising: a non-rotatable tube; a rigid structure fixed on said tube and carrying a plurality of countershafts journalled in the structure; said countershafts being positioned radially around the tube and each having a pinion and a gear thereon; an internal gear having its supporting member journaled entirely on one side of said gears, said internal gear engaging the countershaft pinions; and a driving pinion engaging the gears on the countershafts, the driving pinion and the gears on the countershaft constituting a first gear reduction, and the pinions on the countershaft and the internal gear constituting a second reduction; at least one of said reductions being of the helical type, and adjusting means for causing synchronization of the helical reduction elements.

2. A gearing system comprising a pinion shaft rotatably mounted at one end and freely floating at the other end, a pinion on said freely floating end, a mounting structure, a non-planetary helical gear group supported by said mounting structure and comprising a plurality of gears driven by the pinion shaft, and adjusting means associated with the gear group for imparting both axial and rotary motion to certain members thereof whereby the teeth of said helical gears are matched on said pinion with equal pressure while said pinion remains centered.

3. In a gearing system the combination of: a drive shaft rotatably supported at one end and freely floating at the other end; a mounting structure, a plurality of countershafts journaled in said structure; a pinion on the freely floating end of the shaft; a gear on each countershaft meshing with the pinion; a countershaft pinion on each countershaft in spaced relation from the gear; an internal ring gear meshing with each countershaft pinion and adapted for transmitting power; and adjusting means associated with each countershaft gear for imparting axial and rotary motion thereto and thereby matching the teeth thereof on said pinion with equal pressure while said pinion remains centered.

4. A gearing system comprising a drive shaft rotatably mounted at one end and freely floating at the other end, a helical pinion on the shaft, a mounting structure, a non-planetary helical gear group supported by said structure and comprising a plurality of gears meshing with the pinion, and adjusting means associated with said gears for imparting both axial and rotary motion thereto and thereby matching the teeth thereof on said pinion with equal pressure while said pinion remains centered.

5. A system as set forth in claim 3 in which certain of the pinions and gears are of the helical type.

6. A system as set forth in claim 5, the countershaft gears having hubs, said adjusting means comprising adjustable thrust bearings for rotatably supporting the hubs in the mounting structure.

7. A system as set forth in claim 5 in which the countershafts are two in number and are diametrically opposed.

8. A system as set forth in claim 5 in which the countershafts are three in number and are radially spaced with respect to the drive shaft.

9. A system as set forth in claim 6, the mounting structure being rigid and having a back plate in which the countershafts are journaled and a front plate, the front plate having threaded holes therein, the outer races of said thrust bearings having threads for engagement in the threaded holes whereby upon rotation of the outer races the axial movement may be imparted to the countershaft gears.

10. A system as set forth in claim 6 in which the thrust bearings are of the double opposed tapered roller type having threads on the outer race.

11. A system as set forth in claim 9 in which axial movement of the countershaft gears causes rotary movement of the drive pinion.

12. A gearing system comprising a centrally located shaft, a pinion mounted thereon, a mounting structure, a non-planetary helical gear group supported by said mounting structure and comprising a plurality of gears driven by the pinion shaft, and adjusting means associated with the gear group for imparting both axial and rotary motion to certain members thereof whereby the teeth of said helical gears are matched on said pinion with equal pressure while said pinion remains centered.

References Cited in the file of this patent

UNITED STATES PATENTS

| | | |
|---|---|---|
| 1,305,452 | Farmer | June 3, 1919 |
| 1,387,477 | DeMore | Aug. 16, 1921 |
| 1,919,924 | Blakeslee | July 25, 1933 |